J. R. Cross,
Shaft Coupling,
N°49,386. Patented Aug. 15, 1865.
Fig. 1     Fig. 2     Fig. 3
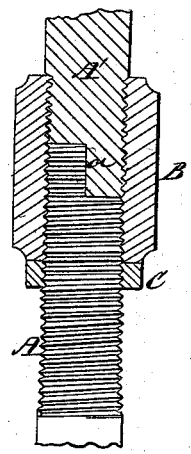 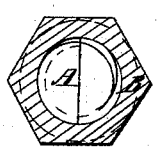 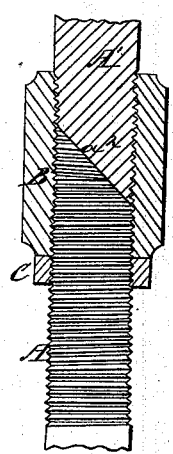
Fig. 5
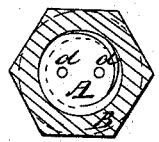
Fig. 4         Fig. 6
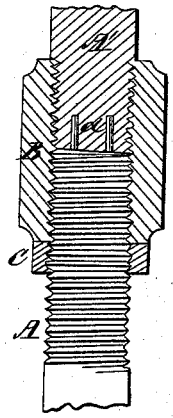 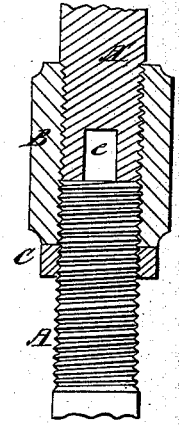
Fig. 7
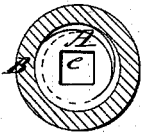
Witnesses.
W. H. Forbush
C. S. Prince
Inventor
John R. Cross

UNITED STATES PATENT OFFICE.

JOHN R. CROSS, OF CHICAGO, ILLINOIS.

COUPLING FOR DRILL OR PUMP RODS.

Specification forming part of Letters Patent No. 49,386, dated August 15, 1865.

*To all whom it may concern:*

Be it known that I, JOHN R. CROSS, of the city of Chicago, county of Cook, and State of Illinois, have invented new and useful Improvements in Couplings for Drill or Pump Rods; and I do hereby declare that the following is a full and exact description thereof, reference being had to the accompanying drawings, making a part of this specification, in which—

Figure I represents a vertical section of my improved device; Fig. II, a cross-section of same; Fig. III, a vertical section of a modification of the same; Fig. IV, a vertical section of a second modification; Fig. V, cross-section of same; Fig. VI, vertical section of third modification; Fig. VII, cross-section of same.

In long drill-rods formed of short lengths coupled together, and used for pumping and drilling oil-wells or other similar purposes, great difficulty has heretofore been found in so coupling such lengths together that, while admitting of easy and quick disconnection, the sudden vibrations and twisting strains to which they are subjected will not cause them to work loose and eventually become disconnected.

My invention overcomes this difficulty and forms a coupling by which the lengths of rods may be quickly and firmly connected, and in a manner which makes it impossible for them to become disconnected by any force or strain to which they may be subjected, while it allows them to be quickly and easily uncoupled when desired.

A A′, Fig. I, represent two lengths of rod to be coupled or united, the contiguous ends being halved or lapped past each other, as shown at $a^2$. Screw-threads are cut upon the contiguous ends in such manner that the thread follows continuously from one to the other.

B represents a screw sleeve or nut made to fit the thread on the rod, which, on one of the rods at least, should be equal in extent to the length of the sleeve, to allow the sleeve to be screwed thereon sufficiently far to cause its end to project through the sleeve. When in this position the other rod may be brought in line, and so that its thread shall form a continuation of that of the first rod, and the sleeve being then turned in the reverse direction until it laps equally onto the end of each rod, the two rods are securely and firmly coupled together. The lapping of the end of one rod past the end of the other prevents the possibility of any twisting strain applied to either rod unscrewing the rods from the sleeve, since the twist of one rod is directly communicated to the other. The rods can only be uncoupled by the turning of the sleeve or nut, an event not likely to occur under any circumstances in which the coupling may be employed. Any possibility of this is, however, prevented by the use of a jam-nut or sleeve, C, of less outside diameter than the sleeve B; or the thread on the rods, after the sleeve is screwed into position, may be filled by winding twine or wire therein in a manner to prevent any movement of the sleeve.

In Fig. III the contiguous ends of the rods, instead of being halved and lapped past each other, are simply beveled or chamfered off, as represented. This, however, is simply a modification of the first device, embodying the same principle—*i. e.*, preventing one rod from turning in the sleeve independently of the other.

In Fig. IV dowel-pins *d* are used for the same purpose, and in Fig. VI a square shank and mortise, *e*.

Having thus described my invention, what I claim, and desire to secure by Letters Patent, is—

Lapping the contiguous ends of two rods to be coupled together past each other, and cutting a screw-thread thereon which shall run continuously from one to the other, in combination with a sleeve or nut, working in the manner and for the purposes set forth.

JOHN R. CROSS.

Witnesses:
B. H. MUEHLE,
W. H. FORBUSH.